(12) United States Patent
Geisinger

(10) Patent No.: US 7,346,890 B1
(45) Date of Patent: Mar. 18, 2008

(54) METHOD AND SYSTEM FOR CREATING LINKABLE PROGRAMMING LANGUAGES

(75) Inventor: Nile Josiah Geisinger, San Pablo, CA (US)

(73) Assignee: dLoo, Incorporated, Alameda, CA (US)

( * ) Notice: Subject to any disclaimer, the term of this patent is extended or adjusted under 35 U.S.C. 154(b) by 593 days.

(21) Appl. No.: 10/390,128

(22) Filed: Mar. 17, 2003

(51) Int. Cl.
*G06F 9/44* (2006.01)

(52) U.S. Cl. ...................... 717/106; 717/114
(58) Field of Classification Search .......... 717/114
See application file for complete search history.

(56) References Cited

U.S. PATENT DOCUMENTS

| | | | |
|---|---|---|---|
| 5,361,355 A | 11/1994 | Kondo et al. |
| 5,450,583 A | 9/1995 | Inada |
| 5,475,817 A | 12/1995 | Waldo et al. |
| 5,632,022 A | 5/1997 | Warren et al. |
| 5,659,735 A | 8/1997 | Parrish et al. |
| 5,842,220 A | 11/1998 | De Groot et al. |
| 5,920,868 A | 7/1999 | Fowlow et al. |
| 5,950,011 A | 9/1999 | Albrecht et al. |
| 6,209,125 B1 | 3/2001 | Hamilton et al. |
| 6,226,792 B1 | 5/2001 | Goffon et al. |
| 6,269,377 B1 | 7/2001 | Collie et al. |
| 6,957,186 B1 * | 10/2005 | Guheen et al. ............. 705/1 |
| 2002/0107935 A1 | 8/2002 | Lowery et al. |

OTHER PUBLICATIONS

Kaiser et al., "Incremental dynamic semantics for language-based programming environments", ACM Transactions on Programming Languages and Systems (TOPLAS), vol. 11, Issue 2 (Apr. 1989) pp. 169-193.*
Bruce Eckel, "Thinking in Java, 3rd ed. Revision 4.0", Nov. 2002, HMTL excerpt print out.*
Geisinger, Nile J. "Method and System For Creating Programs Using Code Having Coupled Syntactic and Semantic Relationships", U.S. Appl. No. 10/060,433, pp. 1-41.

* cited by examiner

*Primary Examiner*—Wei Zhen
*Assistant Examiner*—Philip Wang
(74) *Attorney, Agent, or Firm*—Blakely Sokoloff Taylor & Zafman

(57) ABSTRACT

A method and system for creating reusable software components in the form of linkable programming languages. Linkable programming languages enable programmers to model the natural syntaxes of different domains and extend these languages in a distributed manner. In this way, the present invention brings many of the properties of natural language to the engineering of software.

8 Claims, 6 Drawing Sheets

METHOD AND SYSTEM FOR CREATING LINKABLE PROGRAMMING LANGUAGES

CROSS-REFERENCE TO RELATED APPLICATIONS

"Method and System For Creating Programs Using Code Having Coupled Syntactic and Semantic Relationships", patent application Ser. No. 10/060,433, Nile J. Geisinger

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

References Cited

| | | |
|---|---|---|
| 6,226,792 | May 1, 2001 | Goffon et al. |
| 5,475,817 | December, 1995 | Waldo, et al. |
| 5,450,583 | September, 1995 | Inada |
| 5,920,868 | July, 1999 | Fowlow, et al. |
| 6,209,125 | March, 2001 | Hamilton, et al. |
| 5,659,735 | August, 1997 | Parrish, et al. |
| 5,842,220 | November, 1998 | De Groot, et al. |
| 5,632,022 | May, 1997 | Warren, et al. |
| 5,950,011 | September, 1999 | Albrecht, et al. |
| 5,361,355 | November, 1994 | Kondo, et al. |
| 6,269,377 | July, 2001 | Collie, et al. |

OTHER REFERENCES

"System and method for accessing software components in a distributed network environment", Patent Application 20020107935, Ford, Daniel E.

"Method and System For Creating Programs Using Code Having Coupled Syntactic and Semantic Relationships", patent application Ser. No. 10/060,433, Geisinger, Nile J.

BACKGROUND OF THE INVENTION

1. Field of the Invention

This invention relates to a method and system for creating reusable software components. More specifically, the present invention relates to creating software components that can be posted on networks to create extensible computer languages.

2. Description of the Related Art

Software component technologies, like CORBA and J2EE, provide software building blocks that allow developers to easily share and reuse code. Software components increase the reusability of software by enforcing usage through well-defined interfaces that, in their most common implementations, are automatically generated by vendor supplied tools. The CORBA standard, for example, defines interfaces in the Interface Definition Language (IDL) and the resulting definition creates a contract between the producer of the CORBA component and its consumer. The use of well-defined interfaces, coupled with technologies that provide introspection and other services, enforces good design and increases the reusability of software as a whole.

In addition to traditional software component technologies, networked software component technologies improve on the state of the art by making it possible to reuse software components over a network. Using network software tools, client and server code can be automatically generated from the interfaces of components. The resulting client code contains code to marshall calls made to the client class to the server class. The resulting server class contains both the implementation of the component and code to translate calls received from the client code to the corresponding calls in the implementation of the component. In this way, networked components allow client programs to call code that may be located on other machines in the network as if it was located on the local computer. This enables a distributed form of development in which producers of components publish components on a network and consumers reuse them to build applications.

Present technology is vastly simpler, less powerful, and less scalable than the natural languages that humans use to communicate ideas, processes, and data. To communicate calculus, for example, a math teacher will teach a student the syntax and semantics of the calculus language. A second mathematician, by introducing new symbols in a seminal paper, can extend the mathematical language with ease. A third, on receiving a document that contains these new, unfamiliar symbols, can look up the paper written by the second mathematician and, in this way, understand what they mean. All of this seems natural to us since our ability to extend language and learn new words is an effortless act on our part. But, in computer science, none of the current approaches to distributed systems have the abilities of natural language that we take for granted.

Functions and object signatures do not enable the natural modeling of problem domains as found in natural languages. A calculus library that provides and object-oriented or structured interface does not allow users of the library to use integrals, algebraic formulas, or trigonmetric functions as occurs in standard mathematical formulae. In addition to the naturalness of different domain languages, structured and object-oriented languages suffer from severe scalability problems. As mentioned in the prior invention (Method And System for Creating Programs Using Code Having Coupled Syntactic And Semantic Relationships, 1 Jan. 2002, Ser. No. 10/060,433), methods and objects cripple the ability to build truly scalable software because of their lack of cohesion between syntactic and semantic relationships.

In this invention, we demonstrate a method and system that enables some of the properties of natural language. In particular, the present invention enables multiple parties to define linkable programming languages. This increases the naturalness of the distributed system and enables a more scalable model for building software components.

BRIEF SUMMARY OF THE INVENTION

It is an object of the invention to make it easier to reuse software components by allowing them to be used in natural syntaxes.

It is another object of the invention to make it easier to automatically locate dependencies used by a document written in natural syntaxes.

It is another object of the invention to enable distributed development of software applications.

It is another object of the invention to increase the reusability of software.

The present invention is a method for creating linkable programming languages through the use of reusable software components. The invention eliminates the unnaturalness of using object-oriented or structured syntaxes to model problems in different domains and allows distributed groups of programmers around the world to extend languages by posting new components on the Internet and linking to existing ones.

In the present invention, a new type of component is used that coheses syntactic and semantic relationships together. Because each component contains both the syntax and the semantics of the part of the computer language it defines, it is possible to distribute the components across a network and extend the language by linking new components to existing ones. In the present invention, every time a client requests a document written in one of these languages the client can also request the discrete components that define the language the document is written in. In this way, the present invention brings many of the properties of natural language to software development.

DETAILED DESCRIPTION

Figure 1:
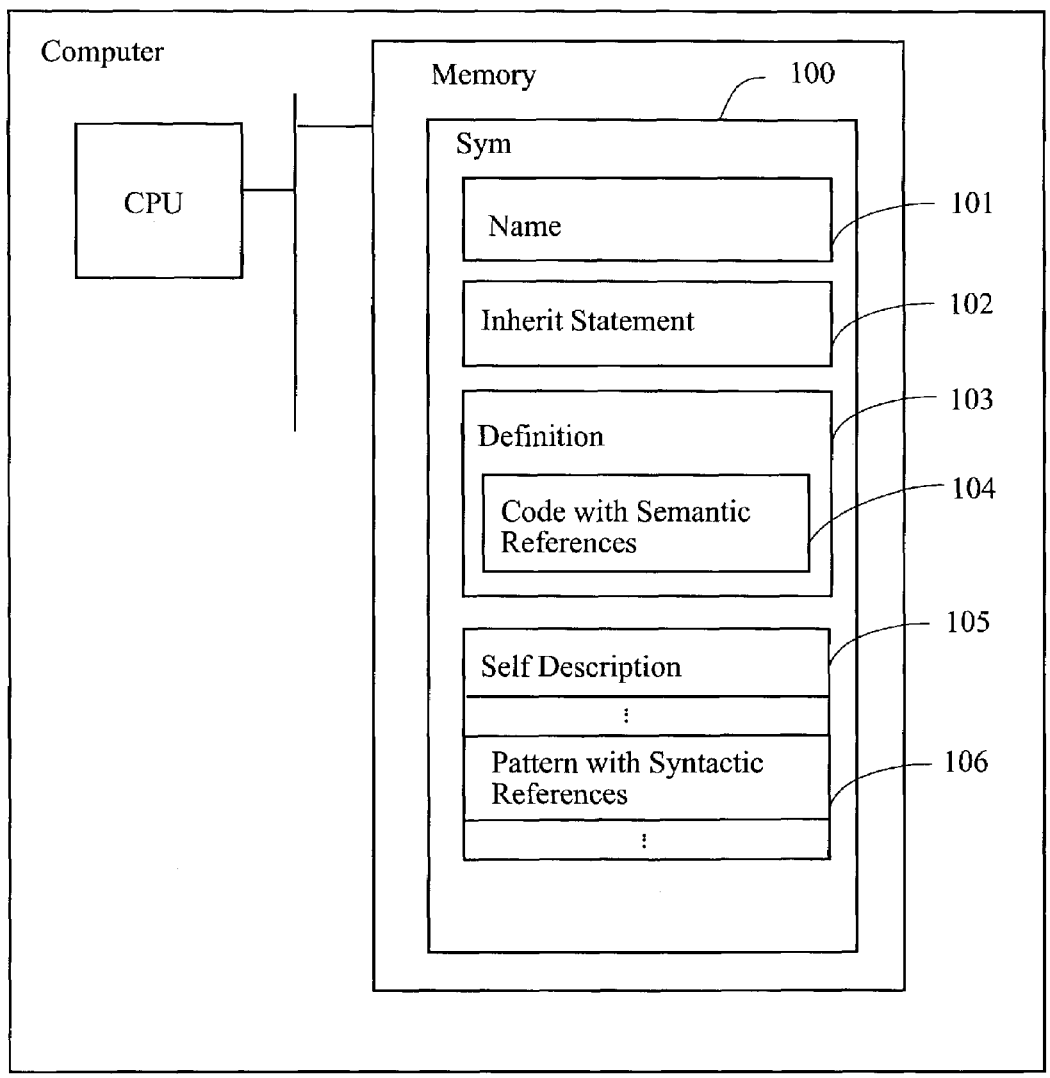
FIG. 1: is a block diagram of an embodiment of a Sym from prior art.

In a previous application from the same applicant (Method And System for Creating Programs Using Code Having Coupled Syntactic And Semantic Relationships, 1 Jan. 2002, Ser. No. 10/060,433) a method and system of programming with a new computer programming unit called a Sym is described. The sections "Background of the Invention", "Brief Summary of the Invention", and the "Definitions" and "Overview" sub-sections from the "Detailed Description of the Invention" section of the previous application are incorporated by reference.

A Sym is a language structure that couples syntactic and semantic relationships similar to the way in which an Object couples data and methods. This coupling makes the process of improving and maintaining code more scalable and allows for the easy construction and processing of domain-specific computer languages.

In the prior application, expressions in such a language were disclosed as existing on a single computer. This disclosure teaches the method and process of the distribution and use of the elements of such a language on a network of computers.

The reader may find it useful to become familiar with the previous invention as an aid to following this disclosure.

Definitions

The term prior invention is defined for purposes of this document as the application Method And System for Creating Programs Using Code Having Coupled Syntactic And Semantic Relationships as mentioned above.

The term Sym is defined for purposes of this document as an embodiment of the programming unit which couples syntactic and semantic relationships as was disclosed in the previous invention.

The term Sym Execution System is defined for purposes of this document as an embodiment of the system described in the prior art.

The term local computer is defined for purposes of this document as a computer which controls the operation of a Sym Execution System.

The term communications protocol is defined for purposes of this document as any agreed upon protocol which specifies how a computer connected to a network can exchange data with another computer on the network. Examples of communications protocols are HTTP, TCP/IP, FTP.

The term network location is defined for purposes of this document as the means by which a communications protocol specifies the location of a data set on a computer within a network, where the network can be Ethernet, LAN, WAN, the Internet and all other networks.

The term server computer is defined for purposes of this document as a computer that makes data available over a network through a communications protocol. Any server computer may simultaneously act as a local computer and thus serve data to itself through a communications protocol.

The term Sym Name is defined for purposes of this document as that name which Syms use to refer to a particular Sym.

The term Sym Match is defined for purposes of this document as an item which is matched by the pattern matching portion of a particular Sym when said item and said Sym are both processed by a Sym Execution System.

The term domain language is meant to refer to a language system which is defined by a set of Syms. Programs written in such a language are composed of Sym Matches.

The term domain-specific language is meant to refer to a language which is designed to be very similar to the language humans used to describe problems within an area or domain of endeavor. The language of chemical formulae is frequently taken as an example of a domain specific language.

A Sym Expression is defined for purposes of this document as set of Sym Matches which comprise a program or a fragment of a program written in some domain language.

The term Sym Document is defined for purposes of this document as a computer file which contains a Sym Expression.

The term Sym Document Name is defined for purposes of this document as the name under which a Sym Document is stored a computer's storage system.

The Sym Link

A Sym Link is the method of a using a network location of a Sym as defined within a communications protocol to refer to said Sym. By processing said Sym Link in accordance with said communications protocol it is possible for a local computer to retrieve said Sym.

This application does not claim any communication protocol as such. It does claim the method of using such a communication protocol to transmit said Sym between computers connected to the same network.

The Sym Link

PREFERRED EMBODIMENT

FIG. 2

In the preferred embodiment the network is the Internet and the communications protocol is HTTP. Within this embodiment the method of a Sym Link is expressed as a URL.

Figure 2:
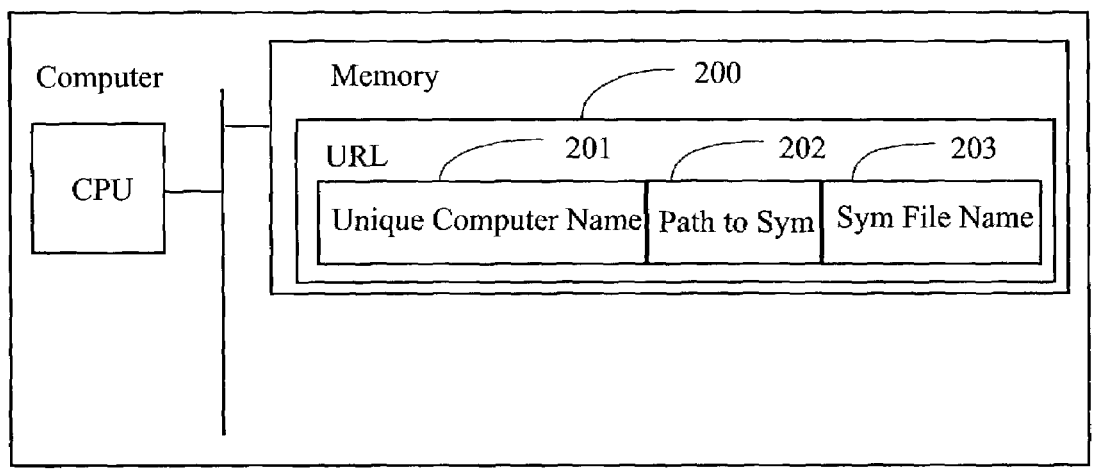
FIG. 2: is a diagram of a URL used as an embodiment of a Sym Link

In FIG. 2 the structure of URL 200 consists of Unique Computer Name 201, Path to Sym 202, and Sym File Name 203. Sym File Name 203 contains the name of the file in which the Sym that this Sym Link references is stored.

Unique Computer Name 201 is unique within the network and is used by the HTTP protocol to direct a request for the file name contained in Sym File Name 203 to the server computer where the Sym is located.

Path to Sym 202 is used to identify the directory on the server computer where the Sym is located.

Sym File Name 203 is the name of the file containing the Sym within the directory residing on the server computer.

Such a URL uniquely identifies the location of a Sym on the Internet.

Structure of a Sym

ONE EMBODIMENT

FIG. 1

FIG. 1 illustrates one possible embodiment of a Sym. It is included here as an aid to explaining the details of this invention.

A Sym 100 contains Name 101, Inherit Statement 102, Definition 103, and Self Description 105.

Name 101 contains the Sym Name of Sym 100. The Sym Name is used by Syms to refer to Sym 101.

Inherit Statement 102 contains the Sym Name of or one or more Syms which are required for Sym 100 to be properly processed by a Sym Execution System. The Syms referred to in Inherit Statement 102 are said to be "parent" Syms from which Sym 100 inherits.

Such a parent Sym may also refer to a higher level parent Sym in its Inherit Statement 102 such that this higher level parent Sym must also be available to the Sym Execution System. This inheritance chain continues until a Sym is reached which has no parent. Such a Sym is described as being part of the base grammar. All Syms in said inheritance chain are necessary to complete the definition of Sym 100.

An embodiment of indicating Sym 100 to be part of the base grammar is to leave Inherit Statement 102 empty.

Definition 103 contains Code with Semantic References 104 which is executed by the Sym Execution System to provide the semantic meaning of Sym 100. Code with Semantic References 104 may contain any computer language which an embodiment of the Sym Execution System can process. Such a language may be a domain language.

Self Description 105 contains one or more instances of Pattern with Syntactic References 106. The set of instances of Pattern with Syntactic References 106 is used to define the syntactic content of Sym 100. Each instance of Pattern with Syntactic References 106 contains code written in any formal computer pattern-matching language that an embodiment of the Sym Execution System can process. Such a pattern-matching language may also be a domain language.

A Pattern with Syntactic References 106 may contain a reference to a Sym Name residing within either Sym 100 or a different Sym. Each Sym which is referred to within a Pattern with Syntactic References 106 and its inherit chain is necessary to complete the definition of Sym 100.

An embodiment of a pattern-matching language is the "regular expression" sub-language used in Perl and Unix Shell programs. To become an embodiment, a pattern-matching language must be extended to include Sym Name references that can be recognized by an embodiment of the Sym Execution System.

Extension of Sym in this Invention

This invention makes changes to the Sym contents to allow a Sym to specify Syms located on the network.

EMBODIMENT OF EXTENSION OF Sym

FIG. 1

In the prior art Inherit Statement 102 could contain one or more Sym Names. Part of this invention is the method and process of allowing a Sym Link to be associated with a Sym Name used within Inherit Statement 102 so as to supply the network location of the referenced Sym.

In the prior art zero or more Sym Names were allowed to be included within an instance of Pattern with Syntactic References 106. Part of this invention is the method and process of allowing a Sym Link to be associated with a Sym Name used within an instance of Pattern with Syntactic References 106 so as to supply the network location of the referenced Sym.

Sym Network Document

In the invention of the prior application when a Sym Document was executed by a Sym Execution System the location of the Syms that were required to process it was already known.

In this invention when a Sym Document is retrieved from the network, the location of the required Syms may not be known. For this reason this current application includes the invention of the Sym Network Document.

A Sym Network Document is a Sym Document that has associated with it a list of Syms that are required to process and execute said Sym Document. Each entry in said list is a Sym Name and a Sym Link to that Sym. Said list is referred to as a Sym Document List.

It is important to note that said Sym Document List need not contain a complete and exhaustive list of all Syms required to process said associated Sym Document. As was described in the Structure of a Sym section, a Sym requires all Syms in its chain of inheritance to complete it definition. It is only necessary for said Sym Document List to include those Syms that have a Sym Match within said associated Sym Document. Higher level Syms are accessed by following the inheritance chain.

It is also possible for the associated Sym Document to be empty or contain zero Sym Matches. A Sym Network Document so constructed can be used as a way to transmit a set of Syms whenever a list of Syms is desired.

Sym Network Document

PREFERRED EMBODIMENT

FIG. 3 and FIG. 6

In the preferred embodiment Sym Network Document 300 contains Sym Document List 301, and Sym Document 307.

Sym Document List 301 contains List Preamble 302 and List 305. List 305 contains zero or more List Entry 306 entries.

In this embodiment List Preamble 302 serves to distinguish Sym Document List 301 from Sym Document 307. This is necessary since the Sym Matches within Sym Document 307 may be of any form and so could be mistaken for instances of List Entry 306 unless this precaution is taken.

List Preamble 302 consists of List Signature 303 and List Length 304. In this embodiment List Signature 303 consists of the character string:

"##Sym#Document#List#Signature##"

which is reasonably unique.

List Length 304 follows List Preamble 303 and contains the entry "!!999999!!" where the characters "999999" are replaced by an integer representing the total size of Sym Document List 301 in bytes. The actual integer is of length necessary to indicate the size of Sym Document List 301 in bytes.

Figure 6:
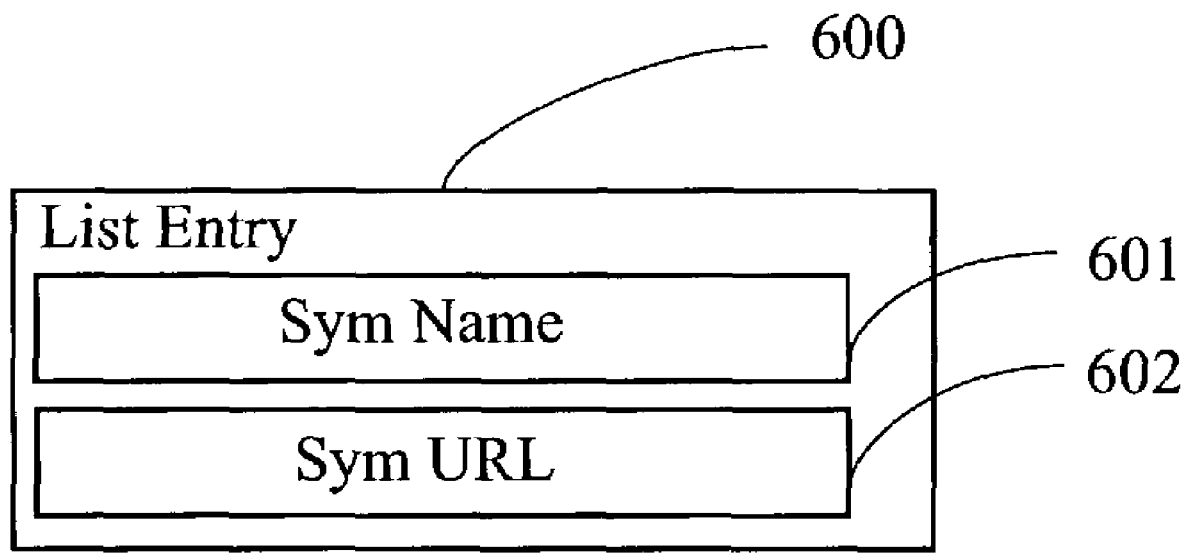
FIG. 6: is a diagram of a List Entry

The structure of List Entry 306 is shown in FIG. 6. In FIG. 6 List Entry 600 is shown to consist of Sym Name 601 which is a Sym Name, and Sym URL 602 which is a Sym Link.

Sym Document 307 is a Sym Document of the prior art as described in the definitions section.

The Sym Document Link

In the prior art a Sym Document can only be retrieved from the local computer's storage.

The present invention includes the method and process of referring to a Sym Document that is located on a server computer by using said Sym Document's network location. This is called a Sym Link.

The Sym Document Link

PREFERRED EMBODIMENT

FIG. 4

In the preferred embodiment using the Internet as the network and HTTP as the communication protocol, the method of a Sym Document Link is a URL.

Figure 4:
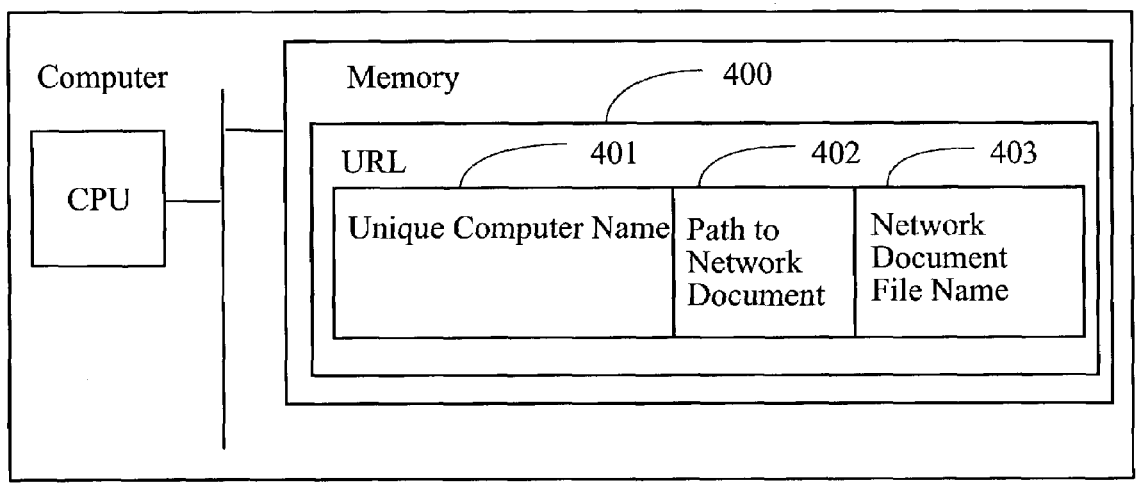
FIG. 4: is a diagram of a URL used as an embodiment of a Sym Document Link

In FIG. 4 the structure of URL 400 consists of Unique Computer Name 401, Path to Network Document 402, and Network Document File Name 403.

Unique Computer Name 401 is the designation of a server computer within the network and is used by the HTTP protocol to direct a request for a Network Document to a server computer where the Network Document is located.

Path to Network Document 402 is used to identify a directory in a server computer where the Network Document is located.

Network Document File Name 403 is the name of the file that contains the Network Document on the server computer.

Such a URL uniquely identifies the location of the Sym Network Document.

The Sym Retriever

A Sym Retriever is a method and process by which a user may retrieve a Sym Network Document located on a network and all Syms located on said network that are necessary for the processing of said Sym Network Document. In one embodiment said Sym Retriever may be linked with a Sym Execution System to provide automatic execution of said Sym Network Document.

To add clarity to this teaching the FIGs from the preferred embodiments above will be used. This invention is intended to cover other embodiments of the method and process of a Sym Retriever, of which the following is only one example.

The Sym Retriever

FUNCTIONAL DESCRIPTION OF ONE EMBODIMENT

FIGS. 1, 3, 4, 5, and 6

Figure 5:
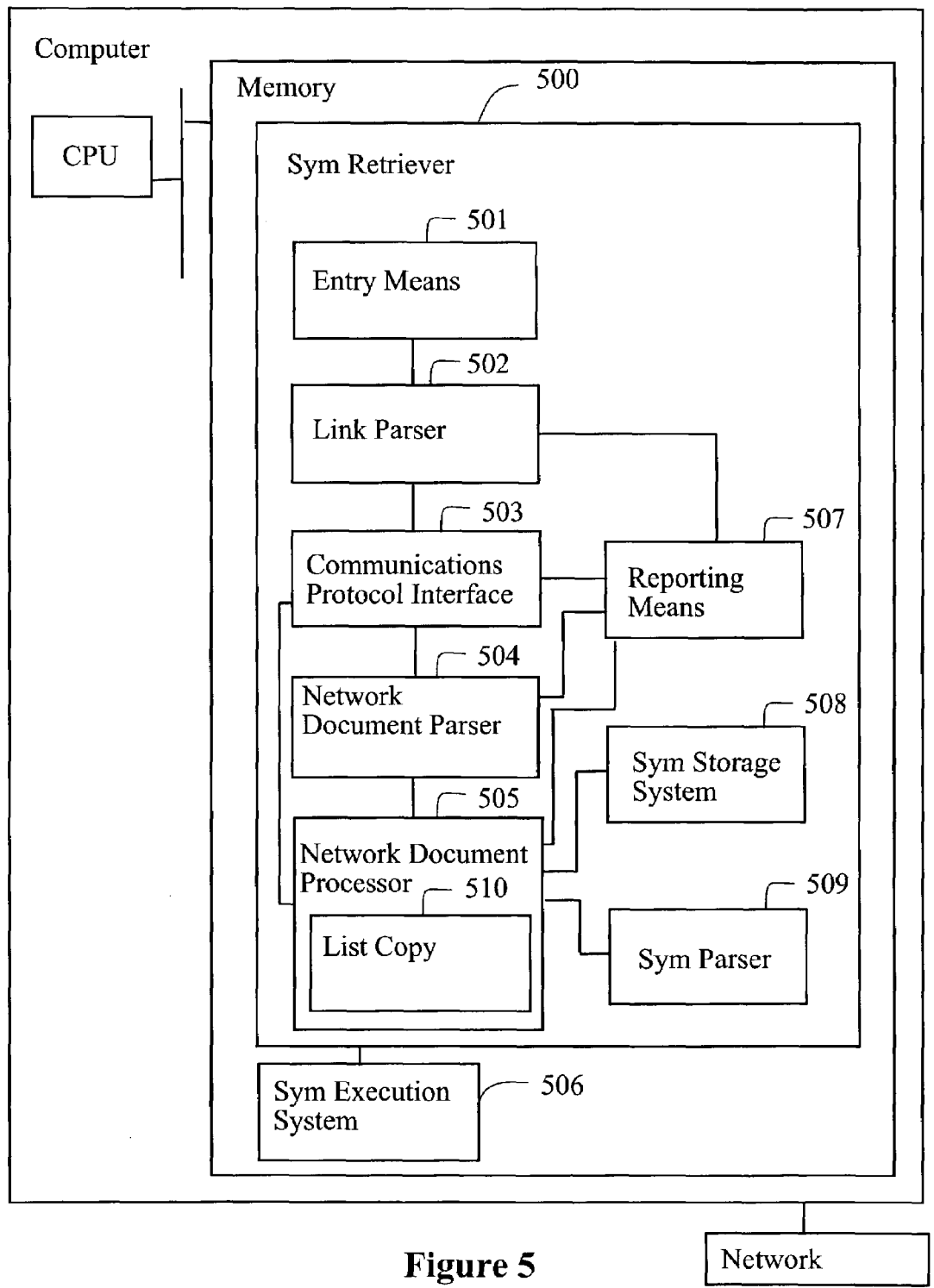
FIG. 5: is a functional diagram of a Sym Retriever

Except where noted, references to items in FIGs in this section are to FIG. 5.

Sym Retriever 500 consists of Entry Means 501, Link Parser 502, Communications Protocol Interface 503, Network Document Parser 504, Network Document Processor 505, Reporting Means 507, Sym Storage System 508, and Sym Parser 509.

A user enters a Network Document Link 400 of FIG. 4 to Sym Retriever 500 by use of Entry Means 501. It should be noted that it is possible for said Network Document Link to refer to a Network Document on the local computer. The entered Network Document Link is transferred to Link Parser 502.

Link Parser 502 examines the Network Document Link and determines if it is a valid network location of the communications protocol. If it is not, an error indication is transmitted to the user via Reporting Means 507 and the process concludes. If the Network Document Link is a valid network location it is transmitted to Communications Protocol Interface 503.

Communications Protocol Interface 503 processes the Network Document Link according to the communications protocol in use and receives a Network Document. The retrieved Network Document is transferred to Network Document Parser 504.

Figure 3:
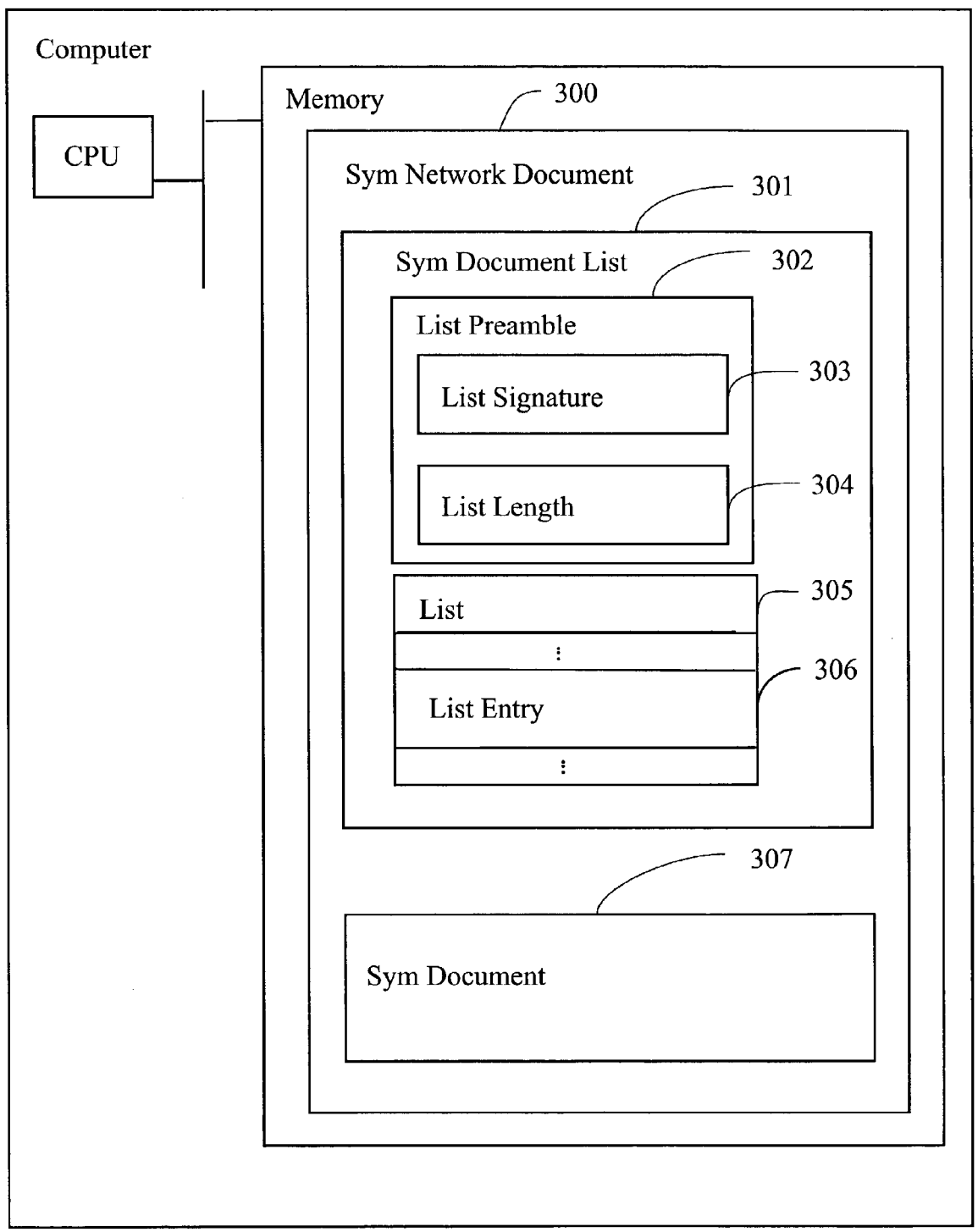
FIG. 3: is a diagram of an embodiment of a Sym Network Document.

Network Document Parser 504 processes said Network Document to recognize the structure of Network Document 300 of FIG. 3. In this embodiment it performs these checks:

(a) verifies that List Signature 303 of FIG. 3 is present and correct;

(b) verifies that List Length 304 of FIG. 3 is of the proper format and does not specify a length which is longer than the size of the retrieved Network Document; and (c) and verifies that each List Entry 306 of FIG. 3 conforms to the structure of a List Entry 600 of FIG. 6 by:
   (i) verifying that Sym Name 601 of FIG. 6 contains a Sym Name; and
   (ii) verifying that Sym URL 602 of FIG. 6 contains a valid network location.

If said Network Document fails any of these tests (a) thru (c) above, an error indication is transmitted to the user via Reporting Means 507 and the process concludes. If said Network Document passes these tests, it is transmitted to Network Document Processor 505.

Network Document Processor 505 copies List 305 of FIG. 3 of the retrieved Network Document to List Copy 510. Each entry in List Copy 510 will then conform to List Entry 600 of FIG. 6. Network Document Processor 505 then follows this process:

(a) accesses the first element in List Copy 510, and if there is no such entry (meaning List Copy 510 is empty) the process is complete;

(b) transmits the Sym Name from the Sym Name 601 of FIG. 6 portion of the first element in List Copy 510 to Sym Storage System 508 which reports the presence or absence of that Sym within the local computer's file system;

(c) removes the first element in List Copy 510 and returns to step (a) if Sym Storage System 508 has reported the presence of a Sym that matches the Sym Name;

(d) transmits the Sym Link from the Sym URL 602 of FIG. 6 portion of the first element in List Copy 510 to Communications Protocol Interface 503 which performs these steps:
  (i) processes the Sym Link according to the communications protocol;
  (ii) receives Sym via the communications protocol; and
  (iii) transmits the received Sym to Network Document Processor 505.

(e) copies the contents of the Inherit Statement 102 of FIG. 1 from the received Sym to the end of List Copy 510 unless the received Sym 100 of FIG. 1 is a member of the base grammar;

(f) scans the set of instances of Pattern with Syntactic References 106 of FIG. 1 within the received Sym to locate Sym references, and moves each of those references to end of List Copy 510;

(f) transmits a copy of the received Sym to Sym Storage System 508 which adds the Sym to storage on the local computer where it can be used by the Sym Execution System;

(g) removes the first element of List Copy 510 which it is has just finished processing; and returns to step (a).

After finishing retrieving all required Syms the Sym-Retriever 500 then transmits a result message to Reporting-Means 507. If any error has occurred, a failure message is sent to Reporting Means 507 and the process is concluded, otherwise a success message is sent to Reporting Means 507.

When all Syms have been successfully retrieved and stored by Sym Storage System 508 it is possible for Sym Execution System 506 to execute the retrieved Sym Document with the Syms in the Sym Storage System 508.

In the preferred embodiment the Sym Retriever can optionally start Sym Execution System 506 and transmit the retrieved Sym Document to be executed. This option can be set to operate without user intervention, or the user can enter such a command via Entry Means 501. When the Sym Execution System is started by the Sym Retriever 500, the Sym Execution System 506 will return its results to Sym Retriever 500 which will report them through Reporting Means 507.

ALTERNATIVE EMBODIMENTS

The foregoing descriptions of specific embodiments of the present invention have been presented for the purpose of illustration and description. They are not intended to be exhaustive or to limit the invention to the precise forms disclosed, and obviously many modifications and variations are possible in the light of the above teaching. These embodiments were chosen and described in order to best explain the principles of the invention and various embodiments with various modifications as are suited to the particular use contemplated. It is intended that the scope of the invention be defined by the Claims appended hereto and their equivalents.

What is claimed is:

1. A system for creating linkable programming languages, the system comprising:
    a first set of programming units on a first computer and a second set of programming units on a second computer coupled to the first computer over a network, wherein each programming unit of the first and second computer comprises a description of at least one legal relationship among a collection comprised of programming units of the first and second computer and/or tokens and encapsulates at least one meaning that implements the at least one legal relationship;
    a matcher that runs programs written in languages defined by programming units of the first and second computer by matching the legal relationships of the programming units of the first and second computer and/or tokens against an input, and running meanings of one or more programming units having matched legal relationships;
    wherein at least one programming unit on the second computer comprises a link to at least one programming unit on the first computer in its description.

2. The system of claim 1, wherein the first set of programming units comprise at least part of at least one first programming language and the second set of programming units comprise at least part of at least one second programming language and the link embeds the at least part of the first programming language in the at least part of the second programming language.

3. A method for creating linkable programming languages, the method comprising:
    describing in a first programming unit on a first computer at least one pattern comprised of links to programming units on a network or links to programming units on the network and tokens, wherein at least one programming unit in the pattern that is linked to is on a second computer coupled to the first computer over the network;
    defining in the first programming unit at least one meaning of the at least one pattern;
    matching the patterns of the programming units of the first computer and the at least one programming unit of the second computer against an input and running meanings of the first programming unit and the at least one second programming unit if there is a match.

4. The method of claim 3, wherein the first programming unit on the first computer extends at least one programming language comprising a collection of programming units on the network.

5. A system for retrieving and running documents written using a linkable programming language, the system comprising:
    a set of programming units that define at least one linkable programming language, where each programming unit in the set describes at least one legal relationship among a collection of programming units and/or tokens on a network and comprises at least one meaning that implements the at least one relationship;
    a matcher that runs programs written in languages defined by programming units by matching a description of the legal relationships of the programming units and/or tokens on a network against an input and running the meanings of the programming units having the matched description;

a document retriever that loads at least one document, wherein at least part of the at least one document is written using at least part of at least one linkable programming language;

a programming unit retriever that loads the set of programming units that define the at least part of the at least one linkable programming language used in the at least one document;

an execution system that uses the set of retrieved programming units to run the at least one document.

6. The system of claim 5, further comprising a user interface that allows a user to specify which documents should be loaded and/or run.

7. A method for retrieving and running documents written in a linkable programming language, the method comprising:

retrieving at least one document, wherein at least part of the at least one document is written using at least part of at least one linkable programming language, where each programming unit in the linkable programming language describes at least one legal relationship among a collection comprised of programming units and/or tokens on a network and comprises at least one meaning that implements the at least one relationship;

retrieving all programming units that define the at least part of the at least one linkable programming language used by the at least one document;

matching patterns of the programming units against an input and running the meanings of the programming units having the matched patterns;

running the at least one document using the retrieved programming units.

8. The method of claim 7, further comprising allowing a user to specify which documents should be loaded and/or run.

* * * * *